2 Sheets—Sheet 1.

J. LUSHER.
Lawn-Mower.

No. 210,794. Patented Dec. 10, 1878.

Witnesses
Fred. G. Dietrich
George Binkenburg

Inventor
John Lusher
by A. Peterson
his Attorney

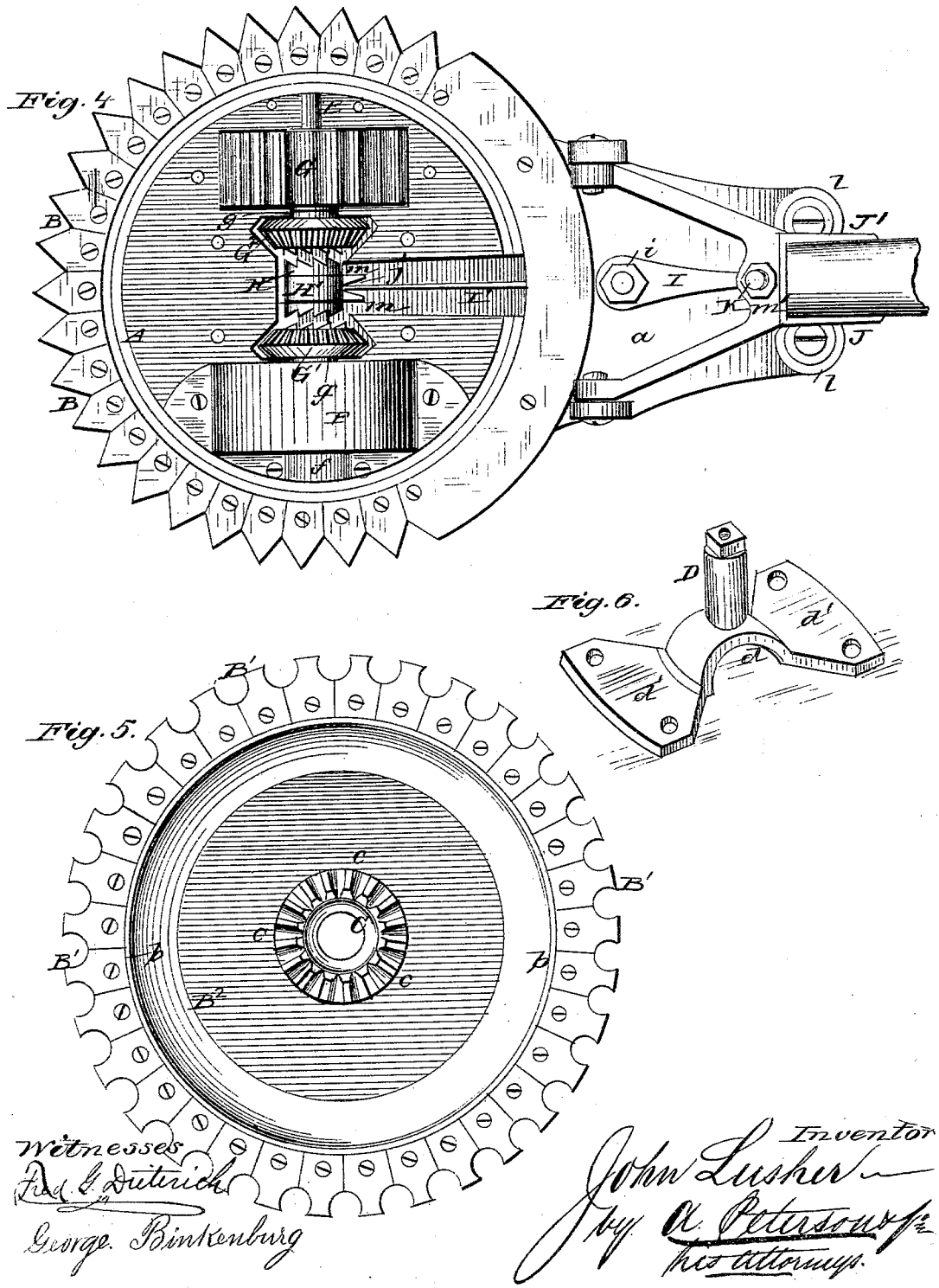

UNITED STATES PATENT OFFICE.

JOHN LUSHER, OF LA PORTE, INDIANA.

IMPROVEMENT IN LAWN-MOWERS.

Specification forming part of Letters Patent No. 210,794, dated December 10, 1878; application filed October 14, 1878.

*To all whom it may concern:*

Be it known that I, JOHN LUSHER, of La Porte, in the county of La Porte and State of Indiana, have invented certain new and useful Improvements in Lawn-Mowers; and I do hereby declare that the following is a full, clear, and exact description of the invention, which will enable others skilled in the art to which it appertains to make and use the same, reference being had to the accompanying drawings, which form a part of this specification, and in which—

Figure 1:
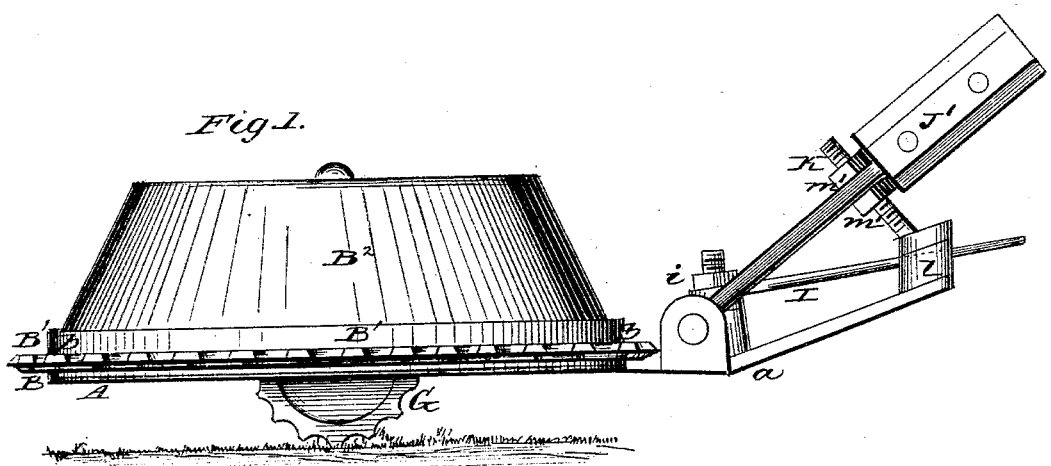
Figure 2:
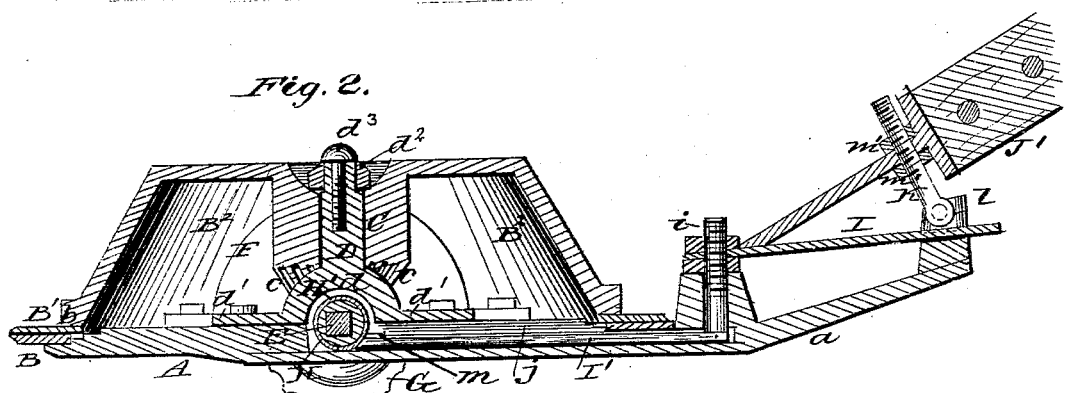
Figures 3, 7:
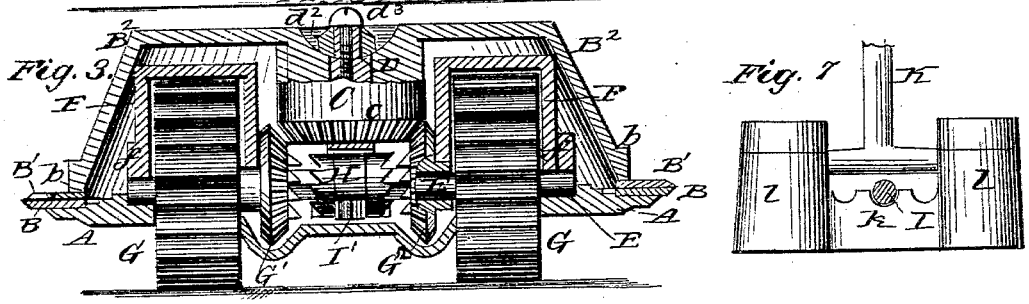

Figure 1 is a side view of my improved lawn-mower. Fig. 2 is a vertical longitudinal section thereof. Fig. 3 is a transverse vertical section of the same. Fig. 4 is a plan view with the upper knife cap or head and its shaft removed, exposing, in part, the knife operating and driving mechanism and the clutch mechanism. Fig. 5 is an inverted plan view of the upper knife cap or head. Fig. 6 is a detailed perspective view of the upper knife-head shaft; and Fig. 7 is a front elevation, partly in section, of the device for adjusting the angle or elevation of the handle-bar.

The same part in the several figures is denoted by the same letter.

This invention relates to certain improvements in lawn-mowers; and it consists in the construction, combination, and arrangement of parts, having for its object to produce a machine which may be easily operated, and which may be readily adjusted while in motion to cut to either side, &c., substantially as hereinafter more fully specified.

In the drawing, A is a base-plate, preferably circular in its general shape or construction, and having its rear end provided with a platform or extension, $a$. B is the lower or stationary series of knives, suitably fastened to the base-plate A in a circular form, as clearly shown in Fig. 4, each knife having, preferably, the form of a saw-tooth, thus providing a correspondingly-shaped throat or space between the knives. $B^1$ is the upper series of knives, arranged circularly around and fastened to a similar or annular flange, $b$, of a conoidal cap or head, $B^2$, so adjusted in position upon its shaft (to be presently described) as to cause its knives $B^1$ to rest directly above and move upon and past the lower stationary knives, B. The cutting-edges of the knives $B^1$ are made preferably so as to constitute semicircular spaces or throats between them, as clearly seen in Fig. 5, while their forward edges are made blunt or truncated, which renders them less liable to be broken or damaged in the event of their coming in contact with an obstruction.

Depending about centrally from the inner upper surface of the cap or head $B^2$ is a sleeve, C, which fits around or upon a central upright shaft, D, having its lower end cast or made with a bridge, $d$, spanning the clutch, and having its feet $d^1$ $d^1$ bolted or otherwise fastened to the upper side of the base-plate A. The upper end of this shaft is detachably fastened to the cap or head by a washer, $d^2$, fitted to said shaft, and secured thereon by a headed screw or bolt, $d^3$, screwing into the same shaft, as seen in either of the sectional views. Any other feasible means may be employed to accomplish this end.

Upon the lower end of the sleeve C is made a series of beveled cogs, $c$; or in their stead may be used a beveled pinion or gear wheel, the purpose of which is to transmit motion to the revolving cap $B^2$, with its knives or cutters $B^1$.

E is a horizontal shaft, confined to its place transversely in the base-plate A by supplemental caps or boxes $f$ of the driving-wheel inclosing boxes F, which are fastened down upon the base-plate A by screws or other suitable fastenings.

G G are the driving and transporting wheels, with transversely-ribbed peripheries, for assisting the propulsion of the same. These wheels are secured to the shaft E. Upon the same shaft are arranged two loose beveled cog-wheels, $G^1$ $G^2$, the inner hubs, facing each other, of which are notched or serrated, to engage with the similarly-notched peripheries or faces of a centrally-arranged sliding clutch, H. That part of shaft E between the loose bevel-wheels $G^1$ $G^2$ is formed square, and the central opening in the clutch-hub H is of a corresponding shape, so that the clutch will rotate with the shaft, while at the same time it may slide to either side. The middle part of clutch H has an annular depression or recess, into which is fitted a sleeve, H′, Fig. 4, which is provided with two projecting lugs, $m$ $m$, forming a wedge-shaped recess, into which is inserted one end of a spring-lever, I'.

I is a hand-lever, connected to a capstan-post, $i$, socketed into the extension $a$ of the base-plate, which post is susceptible of partial rotation, and connected at its lower end to the clutch-shifting spring-lever I', which plays in a wide slot, $j$, in the base-plate A, and connects with the sleeve H' of the clutch H, as already described. The extension or lever I' of the clutch-shifting lever is held down in one of three grooves of a rack, $k$, cast or made with the plate $a$. It is possessed of sufficient spring to permit of its being sprung out of or into either of said grooves by the hand in shifting the clutch.

By moving the lever I to the right the clutch will be caused to engage with the gear-wheel to the opposite or left side, which will cause the cap $B^2$, with its knives $B^1$, to rotate to the right, while by shifting lever I into the notch on the opposite side the clutch will mesh with the bevel-wheel on the right side, and the knives $B^1$ will be rotated to the left.

By moving the clutch to a point centrally between the cog-wheels $G^1$ $G^2$, or dropping the lever I into the central notch of the rack $k$, the knives will be thrown out of motion or operation.

Either of these adjustments may be effected while the machine is in motion.

J' is a bail, hung or pivoted to the extension $a$ of the base-plate of the machine, and adapted for the attachment thereto of the handle. An inverted T-shaped bar, K, with its cross-piece serving as a shaft or axis, it being detachably hung in short posts $l$ of the plate $a$, serves to permit of the holding of the handle at any desired height to accommodate the height of the person using the machine. The upright piece of the T or bar K passes through a cross-piece of the handle-bail, to which it is vertically adjustably connected by jam-nuts $m'$ $m'$, for the purpose aforesaid.

Having thus fully described my invention, I claim and desire to secure by Letters Patent of the United States—

1. In combination, the solid base-plate A, provided with a series of radial knives or cutters, B, and having a horizontal shaft, E, and drive-wheels G G, the bridge-piece $d$, having post or standard D, the conoidal closed cap or head $B^2$, having the cutters $B^1$ and cogged sleeve C, the washer $d^2$, and central screw $d^3$, all arranged and combined substantially as and for the purpose herein shown and specified.

2. In combination, the diametrical drive-shaft E, journaled in boxes $f$ $f$ in the base-plate A, and having a central squared part or section; clutch-hub H, sliding upon said squared section, and provided with a central circumferential groove or depression; loose bevel-wheels $G^1$ $G^2$, having notched or serrated hubs facing the notched sides of the sliding clutch-hub H; sleeve H', inserted loosely in the annular recess in the clutch-hub H, and provided with the lugs or projections $m$ $m$; spring-lever I', vertical shaft $i$, and lever-handle I, all arranged and operating substantially in the manner and for the purpose herein shown and set forth.

3. In combination with base-plate A, having the extension or platform $a$, provided with the posts or studs $l$ $l$, the perforated and bifurcated handle-bail or socket J', pivoted in said extension $a$, and T-shaped brace K, pivoted by its cross-piece between the studs $l$ $l$, and its screw-threaded stem inserted through the perforation in the handle-socket, and held in place adjustably by jam-nuts $m'$ $m'$, substantially as and for the purpose herein shown and described.

In testimony that I claim the foregoing as my own I have hereto affixed my signature in presence of two witnesses.

JOHN LUSHER. [L. S.]

Witnesses:
A. L. BROWN,
J. S. BARNUM.